United States Patent
Kopp

(10) Patent No.: US 7,768,398 B2
(45) Date of Patent: *Aug. 3, 2010

(54) CONTAINER SECURITY SYSTEM

(75) Inventor: Eugene H. Kopp, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 520 days.

This patent is subject to a terminal disclaimer.

(21) Appl. No.: 11/699,654

(22) Filed: Jan. 29, 2007

(65) Prior Publication Data

US 2007/0241892 A1    Oct. 18, 2007

Related U.S. Application Data

(63) Continuation-in-part of application No. 11/401,622, filed on Apr. 10, 2006.

(51) Int. Cl.
G08B 13/14 (2006.01)
(52) U.S. Cl. .............. 340/568.1; 340/545.1; 340/539.1; 340/686.1
(58) Field of Classification Search ................ 340/541, 340/545.1, 545.6, 539.1, 539.22, 686.1, 539.11, 340/539.13, 568.1, 539.26
See application file for complete search history.

(56) References Cited

U.S. PATENT DOCUMENTS

| | | | | |
|---|---|---|---|---|
| 5,877,696 A | * | 3/1999 | Powell | 340/5.33 |
| 6,295,449 B1 | * | 9/2001 | Westerlage et al. | 455/422.1 |
| 7,109,859 B2 | * | 9/2006 | Peeters | 340/539.11 |
| 7,323,981 B2 | * | 1/2008 | Peel et al. | 340/539.13 |
| 7,333,015 B2 | * | 2/2008 | Ekstrom | 340/545.6 |
| 2004/0113783 A1 | * | 6/2004 | Yagesh | 340/568.1 |
| 2005/0070304 A1 | * | 3/2005 | Farchmin et al. | 455/456.1 |
| 2006/0164231 A1 | * | 7/2006 | Salisbury et al. | 340/505 |
| 2006/0181413 A1 | * | 8/2006 | Mostov | 340/539.22 |
| 2007/0093200 A1 | * | 4/2007 | Dobosz | 455/3.02 |
| 2008/0219804 A1 | * | 9/2008 | Chattey | 414/140.3 |

FOREIGN PATENT DOCUMENTS

WO  PCT/US2008/076253    9/2008

OTHER PUBLICATIONS

PCT US2007/006524, International Search Report, Jun. 9, 2008.

* cited by examiner

*Primary Examiner*—Daniel Previl
(74) *Attorney, Agent, or Firm*—Tung & Associates

(57) ABSTRACT

A security system for shipping containers transported onboard a mobile platform detects intrusions into the containers and transmits a security message to a land-based security monitoring station that identifies the container and the current geographic location of the mobile platform. Each container protected by the security system is provided with a cellular telephone that initiates a limited range telephone call transmission in response to an intrusion. Multiple base stations spread over the platform each receive calls from proximal containers and forwards call messages to the platform's communication system which retransmits the call information in the form of the security message to the land based monitoring station.

39 Claims, 3 Drawing Sheets

CONTAINER SECURITY SYSTEM

CROSS REFERENCE TO RELATED APPLICATIONS

This application is a continuation-in-part of U.S. patent application Ser. No. 11/401,622, filed Apr. 10, 2006.

TECHNICAL FIELD

This disclosure generally relates to security for shipping containers, and deals more particularly with a system for detecting and reporting intrusion into containers conveyed in groups, especially on vessels, on a near real-time basis.

BACKGROUND

A substantial amount of the goods that are transported between countries throughout the world are shipped in standardized steel containers twenty or forty feet in length. These containers are carried on ocean going vessels to destination ports where they are unloaded and delivered to their destinations either by truck or rail. Ocean-going vessels specially configured to ship such containers are sometimes referred to as container ships that can carry as many as 5,000 tightly stacked containers. In some cases, the containers are provided with integral twist locks that lock the eight corners of the container to a neighboring container. In other cases, the containers are simply held together by gravity, aided by "hardened" container corners that facilitate aligned stacking.

Because of the widespread use of containerized shipping, security concerns have increased recently where containers must be left unguarded on ocean-going vessels during extended voyages. For example, one security concern may be that of terrorists attempting to place a weapon of mass destruction in a container after it has been loaded onto a vessel. Similarly, contraband items such as drugs may be introduced into containers by drug smugglers after container loading onto a vessel, allowing the drugs to illegally enter a destination port completely undetected. Still another security concern is theft and pilfering of container contents.

A number of solutions have been proposed to deal with the problem of container security. One known solution involves detecting intrusions into a container and simply recording information related to the intrusion for later playback and review. This solution, does not, of course, alert security personnel in sufficient time to allow them to apprehend the intruder or prevent an act of theft or destruction. Another solution uses a GPS receiver to record the location of a container when an intrusion is detected, and a satellite communication system to transmit intrusion and location information to a land-based operations center. However, since the containers are normally stacked on vessels up to fifteen or more containers high, only the security system on the top container has a "view of the sky" adequate to receive GPS signals and transmit security messages to a satellite system. Accordingly, containers below the top container cannot report security status information during a voyage.

It has also been proposed to equip containers with cellular telephones that initiate calls via conventional cellular networks to an operations center in order to report a container intrusion. This approach is not suitable however, for use with containers on-board a vessel during ocean transits where the containers are typically out of range of land-based, commercial cellular telephone networks. Thus, using prior art solutions to the problem, the possibility exists that someone on-board the vessel could open doors on one or more on board containers during the voyage and the intrusion would not be reported to security authorities until the vessel reached its destination. By this time, however, pilfering of container contamination would have already occurred or weapons of mass destruction would have reached a location where they could inflict considerable damage.

Accordingly, there is a need for a shipping container security system that allows constant monitoring for possible intrusions and near real time reporting of intrusions during ocean transit. Embodiments of the disclosure are intended to satisfy this need in the art.

SUMMARY

According to one embodiment, a security system is provided for shipping containers carried on a mobile platform. The platform may comprise an aircraft, a land-based vehicle such as a truck or train or an boat. The system comprises a detection device carried on each container for detecting an intrusion into the container; a radio carried on each of the containers, each of the radios being coupled with a corresponding detection device and responsive to a detected intrusion for transmitting a signal indicating an intrusion; at least one base radio station on the mobile platform for receiving signals from the container radio; and, a communication system on-board the mobile platform for transmitting intrusion event information to a location off-board the platform. The radios preferably comprise a conventional cellular telephone having an identification number related to the container in which it is installed. A plurality of the base stations are preferably spread over the platform so as to assure that each container is within reception range of at least one base station. The system further comprises a computerized controller for coordinating calls received by the base stations and for transmitting security messages, via a satellite, that may include the GPS coordinates of the vessel and/or the platform's identification data.

According to another embodiment, a security system is provided for a group of shipping containers carried on a mobile shipping platform such as an aircraft, a train or a boat. The system comprises a plurality of intrusion detection devices respectively associated with the containers for detecting an intrusion into the associated container; a plurality of cellular telephone units respectively coupled with the intrusion devices and operable for initiating a telephone call when the associated intrusion device detects an intrusion; and, an on-board communication system for receiving telephone calls initiated by the cellular telephones, and for sending messages to a security monitoring station to advise of the intrusion. The cellular telephone units are normally operable for duplex communication on frequencies between about 800 MHz and 1900 Hz. The system further comprises a plurality of base communication stations at spaced apart locations on the shipping platform such that each cellular telephone unit is within communication range of at least one of the base stations.

According to still another embodiment, a method is provided for monitoring the security status of shipping containers being transported on a mobile platform such as an aircraft, a train or a boat. The method comprises the steps of detecting a breach of security in one of the containers; initiating, in response to the breach, a wireless cellular communication transmission from the container to a base station on-board the mobile platform; receiving the cellular transmission at the base station; generating a security status message on-board the mobile platform using the information in the cellular transmission; and, transmitting the message to a security monitoring station off-board the mobile platform. The security message preferably includes an identification of the container in which the security breach was detected as well as the geographic location of the mobile platform.

In accordance with yet another embodiment, a method is provided for monitoring security intrusions into shipping containers on a mobile platform such as an aircraft, a train or a boat. The method comprises the steps of detecting an intrusion into one of the containers; initiating a limited range, wireless radio transmission from the container which includes information related to the intrusion; receiving the transmission at a base communication station on-board the mobile platform; and, re-transmitting the information from the mobile platform to a security monitoring station off-board the platform.

It is a significant feature of the embodiments that all containers on-board a mobile platform can be continuously monitored for security intrusions throughout the entire transit of the containers, irrespective of their positions in the stacks of containers. An advantage of the disclosed system is that security authorities are notified in near real-time of a container intrusion so that adequate time is provided for interdicting the mobile platform or apprehending the persons responsible for the intrusion. A further advantage of the disclosed embodiments is that it may be easily implemented using low cost, existing cellular telephone equipment, and the existing communication infrastructure of mobile platforms such as cargo vessels.

Various additional objects, features and advantages of the various embodiments can be more fully appreciated with reference to the detailed description and accompanying drawings that follow.

BRIEF DESCRIPTION OF THE ILLUSTRATIONS

DETAILED DESCRIPTION

Figure 1:
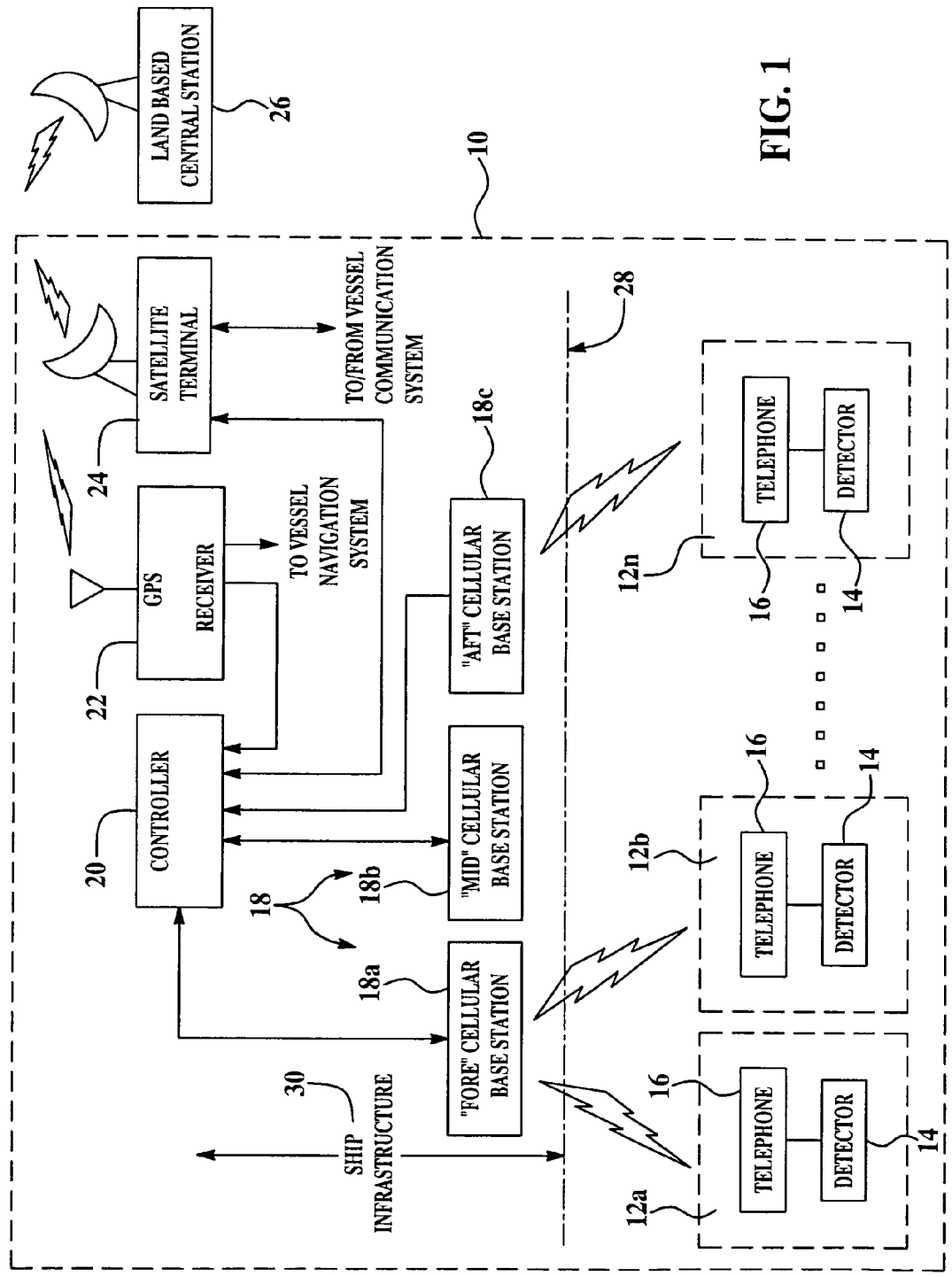
FIG. 1 is a block diagram illustration of a container security system according to one embodiment.
Figure 2:
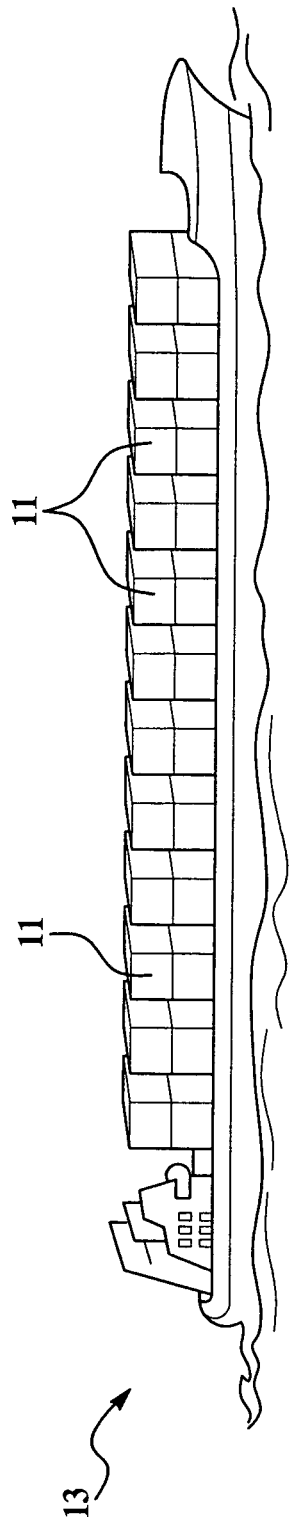
FIG. 2 is a side illustration of a vessel carrying a group of containers monitored by the container security system illustrated in FIG. 1.

Referring to FIGS. 1 and 2, one embodiment relates to a container security system 10 for reporting, in near real-time events, such as security breaches, such as intrusions into shipping containers 11 on-board a mobile platform, such as a container ship 13 where the containers 11 are stored in stacked relationship. At least certain of the containers 11 are provided with a container security device (CSD) 12 which preferably is mounted inside the container 11 so as to be protected against damage or tampering. The containers 11 are typically rigid, sealed enclosures, such as the well known steel shipping containers 20 or 40 feet in length having standardized dimensions and features that facilitate stacking them in interlocking relationship.

Each of the CSDs 12a-12n shown in the illustrated embodiment includes a detector 14 connected with a wireless communications transmitter in the form of a cellular telephone 16. The detector 14 detects security events of interest, such as an intrusion into the container in which it is installed. Thus, for example, the detector 14 may comprise a simple switch activated by the opening of a door on the container, or it may be a motion sensor, light sensor, heat sensor or explosives sensor. Multiple detectors may be used in the same container 11 to detect different types of events, e.g. intrusion and fire. Such detectors are commercially available and therefore need not be described in detail therein. It should be emphasized here that, as mentioned above, not all of the containers 11 on the vessel need be equipped with a CSD 12. Containers 11 with and without CSDs 12 can be mixed on the same vessel 13.

The telephone 16 may comprise a conventional cellular telephone, also known as a mobile phone, readily available from a variety of commercial sources. Each of the telephones 16 possesses a unique identification number, i.e. phone number that is associated with the container 11 in which the telephone is installed. Suitable interface circuitry, conventional in the art, interconnects each CSD 12a-12n with associated cellular telephone such that the telephone 16 is responsive to activation of the associated detector 12 to initiate a telephone call containing a message relating to the detected security event at the container. Each of the telephones 16 has an antenna (not shown) normally mounted outside of the container 11 (typically on the exterior surface of the container), for transmitting and receiving calls.

The container security system 10 further includes one or more cellular telephone base stations 18 on-board the ship 13 that receive calls from the telephones 16. In the illustrated embodiment, three base stations 18a, 18b and 18c are illustrated which are respectively mounted at fore, mid and aft locations on the vessel 13. The number of base stations used and their placement in a particular application will depend on the number of containers 11, the length and physical configuration of the ship 13, and the propagation characteristics of cellular signals in the particular container environment. As is common in cellular networks, each of the CSDs 12 communicates with the base station 18 that receives the strongest signal.

The cellular telephones 16 and base stations 18 may utilize any of various well known technologies such as FDMA, TDMA or CDMA. Cellular telephone systems currently in use, including second and third generation technologies, operate between approximately 800 MHz and 1900 MHz. One system widely used throughout the world is GSM (global system for mobile communications) which utilizes TDMA and encryption technologies. Any of these currently available systems and technologies may be employed in connection with the disclosed embodiment, however until a particular system is chosen as the world wide standard, it may be necessary to employ base stations 18 using more than one of the currently existing technologies to accommodate cellular telephones 16 that use different systems. It should be noted here that as an incidental benefit of the present security system 10, cellular telephone service is provided throughout the ship 13 for normal voice calls. Thus, shipboard personnel may make cellular calls to other personnel on-board the vessel 13, or to land based parties using the satellite communication infrastructure 30 on the ship 13 to forward the voice calls.

The base stations 18 are controlled by a computer based controller 20. The controller 20 aggregates the message reports from the base stations 18 and appends the current location (e.g., coordinates) of the ship 13 based on ship location received from a GPS receiver 22 on-board the ship 13. The controller 20 forwards the messages and/or aggregated reports with the ship's position information to an on-board satellite communication terminal 24 which transmits the information via communication satellites to a land based monitoring station 26 where the security status information can be reviewed by security personnel for appropriate action.

As shown in FIG. 1, the components above the broken line 28 within container security system 10 form part of the ship's infrastructure 30, while the components below line 28 are associated with containers being shipped on the vessel 13. In the illustrated embodiment, the GPS receiver 22 also functions to provide the ship's navigation system with GPS location information. The satellite terminal 24 forms part of the ship's existing communication system.

In operation, the detectors 14 function to sense security events related to the associated container 11, such as the opening of an access door, causing the associated cellular telephone 16 to initiate a call. The call is received by the base station 18 that receives the strongest call signal from the calling telephone 16. Usually, the base station 18 receiving the call is the one that is physically nearest the container 11 from which the call originates. Note here that all calls are received by at least one of the base stations 18, regardless of the calling container's position in a container "stack."

The message transmitted by the cellular telephone 16 to a base station 18 may include any of various information, but will normally include at least the container identification number and the time of the message transmission. Alternatively, the base station 18 may append the time of the transmission when it forwards the message to the controller 20. Importantly, since the cellular connection between the base stations 18 and the telephones 16 is duplex i.e. two-way, the controller 20 and/or base station can "talk to" any of the CSDs 12a-12n. Thus for example, in the event that one of the CSDs 12a-12n reports a security event such as "door open" and the controller 20 wishes to verify the reported event before sending notice to the monitoring central station 26, the controller 20 and/or the base station 18 receiving the alarm message can instruct the telephone 16 to verify the detected condition and then re-transmit a message, thus eliminating possible false alarms due to momentary communication "glitches."

As previously noted, the controller 20 normally aggregates information from the base stations 18 and periodically delivers a report to the land-based monitoring stations 26. In order to conserve bandwidth, the report generated by the controller 20 may include only those containers that report a security related event, that is, reporting by exception. Using the container security system of the present invention as described above, land-based monitoring stations 26 will receive periodic reports regarding the security of each of the containers onboard the vessel up until the vessel arrives at a destination port. The reports can be sent periodically in batches as indicated above, or immediately upon the detection of a security event, thus providing near real-time critical security information to land based monitoring stations 26. In the event that the reported security information reveals an alarm or other security condition raising suspicion or concern, the vessel can be diverted well before it reaches its destination port.

While an embodiment has been described above in connection with shipping containers 11 on-board an ocean-going ship 13, other embodiments can be used with a wide variety of mobile platforms to track the status of items carried on or associated with the platform. As will be discussed in more detail below, these platforms may include, but are not limited to, ships, boats, trucks, cars, trains, aircraft and other vehicles and conveyances. The items whose status can be monitored may include a wide variety of containers, boxes, baggage, cargo, equipment, vehicles and other items that are moved as a group along with a mobile platform or conveyance.

Figure 3:
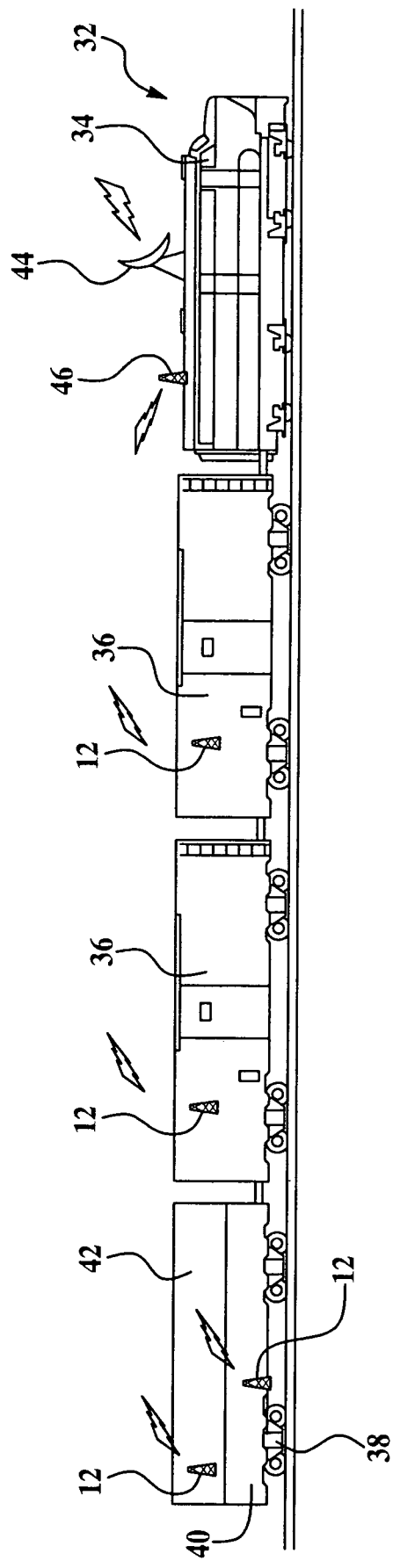
FIG. 3 is side elevation illustration of a train with freight rail cars having a container security system according to an embodiment.

Referring now concurrently to FIGS. 1 and 3, a train 32 includes a locomotive 34 pulling cargo box cars 36 and a container car 42, which are merely illustrative of a wide range of cars that may form part of the train 32. The locomotive 34 may be equipped with a base station 18, controller 20, GPS receiver 22 and a satellite terminal 24, including a satellite dish 44. A base station antenna 46 is carried on the locomotive for receiving cellular calls from CSDs 12 located on the train 32. Each of the box cars 36 may be equipped with one or more of the CSDs 12. The CSDs 12 located on the box cars 36 may detect an intrusion into the car 36, or an event related to contents within the car 36, such as, without limitation, a fire, breakage, issuance of gases, spillage, a temperature reading, to name only a few.

Each of the cars 36 may contain closed shipping containers (not shown) which are equipped with CSDs 12 that sense a change of condition related to the container, such as an unauthorized attempt to enter, or an actual entry into the container. The contents may comprise items other than containers. For example, the cars 36 may contain one or more vehicles (not shown) that are transported by the train 32. Each such vehicle could be equipped with an CSD 12 that would initiate a cellular telephone call to the base station 18 located on the locomotive 34. A controller 20 and satellite terminal 24 on the locomotive 34 would then relay the call information along with the geographic coordinates of the train 32 to a central station 26. Alternatively, the base station 18, controller 20 and satellite terminal 24 could be located on any of the cars 36, 38, rather than on the locomotive 34.

The container car 38 may transport one or more removable standard or non-standard shipping containers 40, 42, each of which is equipped with a CSD 12. The shipping containers 40, 42 may form part of a group of containers that were monitored during transport on an ocean-going ship 13 (FIG. 2) as previously described. Thus, it may be appreciated that the security system 10 of the disclosed embodiments, may be used to continuously monitor the security of the containers 40, 42 during transport over sea and land, from a point of embarkation to a final destination.

Figure 4:
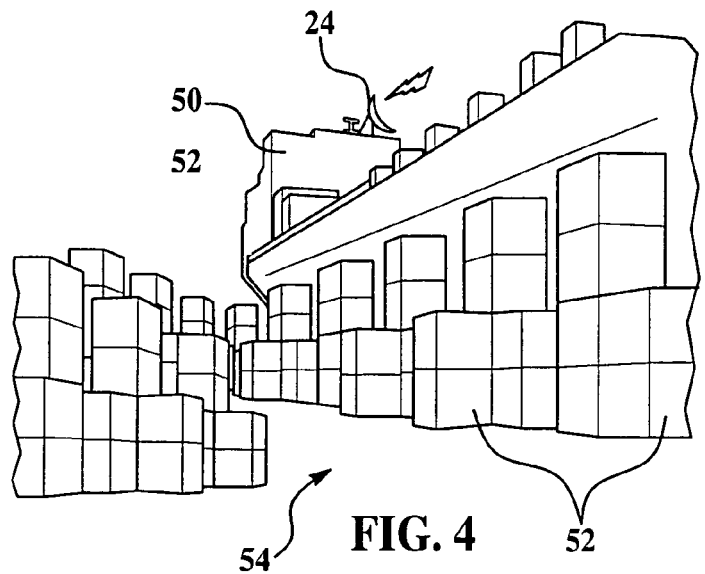
FIG. 4 is a perspective illustration of a shipping vessel and shipping containers stacked at a dockside.

Referring to both FIGS. 1 and 4, the security of containers 52 that are temporarily stationary may be monitored. For example, a group of the containers 52 equipped with CSDs 12 that have been unloaded from a ship 50 may be temporarily stored at a dockage location 54, or other storage location, while awaiting transport over land by train or truck, to a final destination. A base station 18, along with a controller 20, GPS receiver 22 and satellite terminal 24 may be located at the storage location 54 or within cellular telephone range of the CSDs 12 on the containers 52. If the temporary storage location 54 of the containers 53 is within range of wireless communication networks other than satellite communication networks, other forms of wireless communication networks may be used to transmit the security messages to the base station 26, instead of the satellite terminal 24. If the storage location 54 is nearby the ship 50, the communication infrastructure 30 of the ship 50 can be used to transmit security messages from the CSDs on the containers 52 to the central station 26, even though the containers 52 have been off-loaded from the ship 50.

Figure 5:
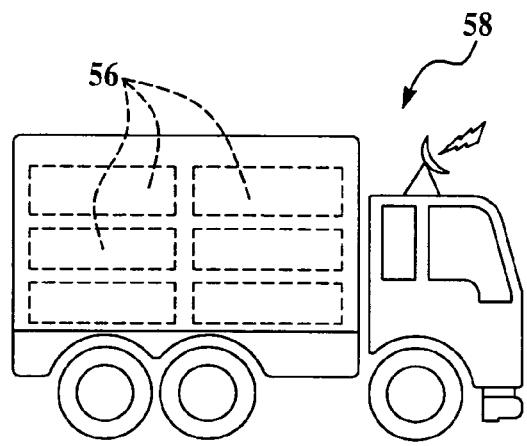
FIG. 5 is an elevation illustration of a truck carrying containers.

As shown in FIG. 5, the security of one or more containers 56 equipped with CSDs 12 which are carried on a land-based mobile platform, such as a truck 58, can also be monitored. The truck 58 may carry on-board communication components (not shown) which are the equivalent of the ship infrastructure 30, to transmit the container security messages to the central station 26.

Figure 6:
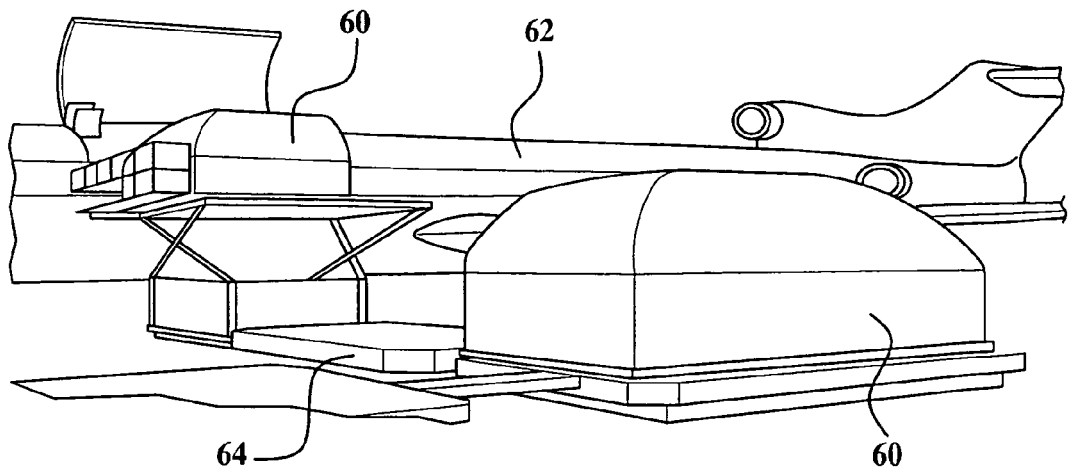
FIG. 6 is a perspective illustration of cargo containers being loaded onto cargo aircraft.

FIG. 6 illustrates the application of the container security system 10 for monitoring the security of containers 60 and other cargo items on an aircraft 62. The containers 60 may be standardized, rigid containers commonly used in the commercial air cargo industry which are configured to be handled by specialized ground equipment 64. The aircraft 62 includes internal cargo compartments (not shown) where the containers 60 are stored as a group. Each of the containers 60 may include a CSD 12, which communicates container security status to a base station 18 forming part of the communication infrastructure 30 of the aircraft 62. The security status messages are transmitted to the land-based central monitoring station 26 using either a satellite communications terminal 24 on the aircraft 62 or another form of communication network commonly used by commercial aircraft, such as UHF. The container security system 10 is not limited to monitoring the standardized containers 60 but rather can be used with other items of cargo transported by the aircraft, such as groups of baggage or other cargo items.

Although certain exemplary embodiments have been described, it is to be understood that the specific embodiments are for purposes of illustration and not limitation, as other variations will occur to those of skill in the art. Furthermore, while embodiments have been illustrated in connection with their application to containers carried on particular forms of shipping conveyances, it should be appreciated that the present container security system 10 could be used with groups of various items carried by a wide range of mobile platforms, especially where the items are carried over areas not served by normal cellular phone coverage. Moreover, the embodiments could also be used to provide security for a group of shipping containers in land based storage. Finally, it should be noted that other forms of wireless one-way or two-way communication devices could be employed rather than the cellular telephone described in connection with the illustrated embodiment.

What is claimed is:

1. A security system for a group of cargo items carried on a mobile platform, comprising:
   a detection device carried on each item for detecting an intrusion into the item;
   a wireless transmitter carried on each of the items and coupled with the corresponding detection device;
   at least one base receiver station on the platform for receiving signals from the wireless transmitters carried on the items;
   a communication system on-board the platform, the communication system being communicatively coupled with the base receiver station and operable for transmitting information relating to the detected intrusion to a location off-board the platform;
   a plurality of the wireless transmitters respectively carried on the items, each of the transmitters being coupled with a corresponding detection device responsive to a detected intrusion, said wireless transmitter for transmitting a signal indicating detection of the intrusion; and
   a plurality of the base receiver stations located in spaced apart relationship on the platform,
   wherein each of the base receiver stations receives signals from the wireless transmitters in closest proximity to a respective base receiver station, each of said items further comprising a wireless receiver coupled with the wireless transmitter to provide duplex communication with said respective base receiver station, said duplex communication comprising signals originating with said respective base receiver station.

2. The security system of claim 1, wherein each of the transmitters comprises a cellular telephone.

3. The security system of claim 2, wherein each of the cellular telephones has a unique identification number correlated to the item on which it is carried.

4. The security system of claim 1, wherein the base receiver stations are longitudinally spaced along the length of the platform.

5. The security system of claim 1, wherein the communication system includes a controller for receiving the signals from the base stations and for generating messages for transmission to the off-board location, wherein each of the messages includes identification of the item in which an intrusion has been detected and the geographic location of the platform.

6. The security system of claim 5, wherein the controller includes a computer responsive to requests from the off-board location to transmit the transmit intrusion detection information for all of the items to the off-board location.

7. The security system of claim 1, wherein the communication system includes a satellite transmitter for transmitting the information to the off-board location via a communications satellite.

8. The security system of claim 1, wherein the transmitter and receiver operate in said duplex communication on frequencies between about 800 MHz and 1900 MHz.

9. The security system of claim 1, wherein the communication system includes a computer responsive to requests from the off-board location to transmit intrusion detection information for all of the items to the off-board location.

10. A security system for a group of shipping containers carried on a mobile shipping platform, such as an aircraft, a train, a truck or a boat, comprising:
    a plurality of security event detection devices respectively associated with the containers for detecting a security event occurring at the associated container;
    a plurality of cellular telephone units respectively coupled with the detection devices and operable for initiating a telephone call when the associated detection device detects a security event; and,
    a communication system on-board the mobile platform for receiving telephone calls initiated by the cellular telephone units, and for sending messages to a security monitoring station off-board the mobile platform;
    wherein each of the cellular telephone units is attached to the associated container;
    the communication system includes a plurality of base communication stations positioned at spaced apart locations on the mobile platform, each of the base stations being within communication range of certain ones one of the telephone units; and,
    the cellular telephone units and the base stations form a plurality of communication cells, each of said cellular telephone units providing duplex communication with a respective base station in closest proximity, said duplex communication comprising signals originating with said respective base station.

11. The security system of claim 10 wherein said duplex communication operates on radio frequencies between about 800 MHz and 1900 MHz.

12. The security system of claim 10, wherein at least certain of the detection devices are operable to detect the opening of an access door in the associated container.

13. The security system of claim 10, wherein each of the cellular telephone units includes a unique communication address that identifies the associated container.

14. The security system of claim 10, wherein:
the telephone units and the base stations are arranged in a plurality of communication cells in which a group of the telephone units are associated with and communicate only with one of the base stations.

15. The security system of claim 14, wherein the communication system includes:
a wireless radio transmitter for transmitting the messages from the mobile platform to the security monitoring station, and
a controller for controlling the operation of the base stations, and for generating the messages based on detection information obtained from telephone calls initiated by the cellular telephone units.

16. The security system of claim 15, wherein each of the messages includes identification of the container in which the security event is detected and the geographic location of the mobile platform.

17. The security system of claim 14, wherein the communication system includes a satellite transmitter for transmitting the messages from the mobile platform to a communications satellite for delivery to the security monitoring station.

18. A security system for a container carried on mobile platforms comprising:
a GPS receiver for providing the position of the container;
a satellite terminal for transmitting security status information to a security monitoring station off-board the mobile platform;
a plurality of cellular base stations;
a cellular device for transmitting the security status of the container to the cellular base station; and,
a computer for receiving the security status information from the base station, for receiving the container position from the GPS receiver, and for directing the satellite transmitter to transmit the security status information and the container position to the security monitoring station;
wherein a plurality of said cellular devices are respectively carried on the containers, each of the cellular devices being coupled with a corresponding detection device responsive to a detected intrusion, said cellular devices for transmitting a signal indicating detection of the intrusion; and
said plurality of the cellular base stations located in spaced apart relationship on the mobile platform;
wherein each of the cellular stations receives signals from the cellular devices in closest proximity to a respective cellular base station, each of said cellular devices providing duplex communication with said respective cellular base station, said duplex communication comprising signals originating with said respective cellular base receiver station.

19. The security system of claim 18, wherein the computer receives requests for real-time container security status from the satellite terminal and is responsive to the requests to direct the satellite transmitter to transmit the real time security status of the container to the security monitoring station.

20. The security system of claim 18, wherein the computer is responsive to requests from the security monitoring station to direct the satellite transmitter to transmit the security status of the container.

21. The security system of claim 18, wherein the cellular device has a unique identification number correlated to the container for which it transmits security status.

22. The security system of claim 18, wherein the container, GPS receiver, satellite terminal, base station and cellular device are carried on-board the mobile platform.

23. A method of monitoring the security status of shipping containers being transported on a mobile platform such as an aircraft, a train or a boat, comprising the steps of:
(A) detecting a breach of security in one of the containers;
(B) initiating a cellular communication transmission from the container to a base communication station onboard the mobile platform;
(C) receiving the cellular transmission at the base communications station;
(D) generating a security status message onboard the mobile platform using the information contained in the transmission received in step (C); and,
(E) transmitting the message generated in step (D) to a security monitoring station off-board the mobile platform;
wherein a plurality of cellular devices are respectively carried on the containers, each of the cellular devices being coupled with a corresponding detection device responsive to a detected intrusion comprising said breach of security, said cellular devices for transmitting a signal indicating detection of the intrusion; and
a plurality of the base communications stations located in spaced apart relationship on the mobile platform;
wherein each of the base communications stations receives signals from the cellular devices in closest proximity to a respective base communications station, each of said cellular devices providing duplex communication with said respective base communications station, said duplex communication comprising signals originating with said respective base communications station.

24. The method of claim 23, whereon step (A) includes detecting an intrusion into the container.

25. The method of claim 23, wherein:
step (B) is performed using a cellular telephone.

26. The method of claim 23, wherein the message generated in step (D) includes an identification of the container in which the security breach was detected in step (A), and the geographic location of the mobile platform.

27. The method of claim 23, wherein step (E) is performed using a satellite communication system.

28. The method of claim 23, further comprising the steps of:
(F) receiving a container security status request from the security monitoring station; and,
(G) transmitting to the security monitoring station the security status of all of the containers.

29. The method of claim 23, further comprising the step of:
(F) periodically transmitting to the security monitoring station the security status of all of the containers.

30. The method of claim 29, wherein step (F) is performed using a satellite terminal onboard the mobile platform.

31. A method of monitoring security intrusions into shipping containers on a mobile shipping platform such as an aircraft, a train or a boat, comprising the steps of:
(A) detecting an intrusion into one of the containers;
(B) initiating a limited range wireless radio transmission from the container, wherein the wireless transmission contains information related to the intrusion detected in step (A);
(C) receiving the transmission at a base communication station onboard the mobile shipping platform within range of the transmission; and,
(D) re-transmitting the information from the mobile shipping platform to a security monitoring station off-board the mobile shipping platform;
wherein a plurality of wireless radio transmission devices are respectively carried on the containers, each of the wireless transmission devices being coupled with a corresponding detection device responsive to the detected intrusion, said cellular wireless radio transmission devices for transmitting a signal indicating detection of the intrusion; and a plurality of the base communication stations located in spaced apart relationship on the mobile platform;

wherein each of the base communication stations receives signals from the wireless radio transmission devices in closest proximity to a respective base communication station, each of said containers further comprising a wireless receiver coupled with the wireless transmitter to provide duplex communication with said respective base communication station, said duplex communication comprising signals originating with said respective base communication station.

32. The method of claim 31, wherein step (B) is performed using a cellular telephone, and the transmission includes information identifying the cellular telephone initiating the transmission.

33. The method of claim 32, including the step of associating the identity of the cellular telephone with the identity of the container from which the radio transmission was initiated.

34. The method of claim 31, including the step of placing said plurality of the base communication stations at spaced apart locations on the mobile shipping platform respectively defining communication cells.

35. The method of claim 31, wherein step (D) is performed using a satellite communication system.

36. The method of claim 31, further comprising the step of transmitting the geographic location of the mobile shipping platform to the security monitoring station along with information retransmitted in step (D).

37. The method of claim 31, further comprising the steps of:
 (E) receiving a container security status request from the security monitoring station; and,
 (F) transmitting to the security monitoring station the security status of all of the containers.

38. The method of claim 31, further comprising the step of:
 (E) periodically transmitting to the security monitoring station the security status of all of the containers.

39. The method of claim 38, wherein step (E) is performed using a satellite terminal onboard the mobile shipping platform.

* * * * *